3,183,680
ABSORPTION REFRIGERATING SYSTEM
Walter Billi, Milan, Italy, assignor to Montecatini Società Generale per l'Industria Mineraria e Chimica, Milan, Italy, a corporation of Italy
Filed Oct. 26, 1962, Ser. No. 233,281
Claims priority, application Italy, Oct. 30, 1961, 19,398/61
6 Claims. (Cl. 62—112)

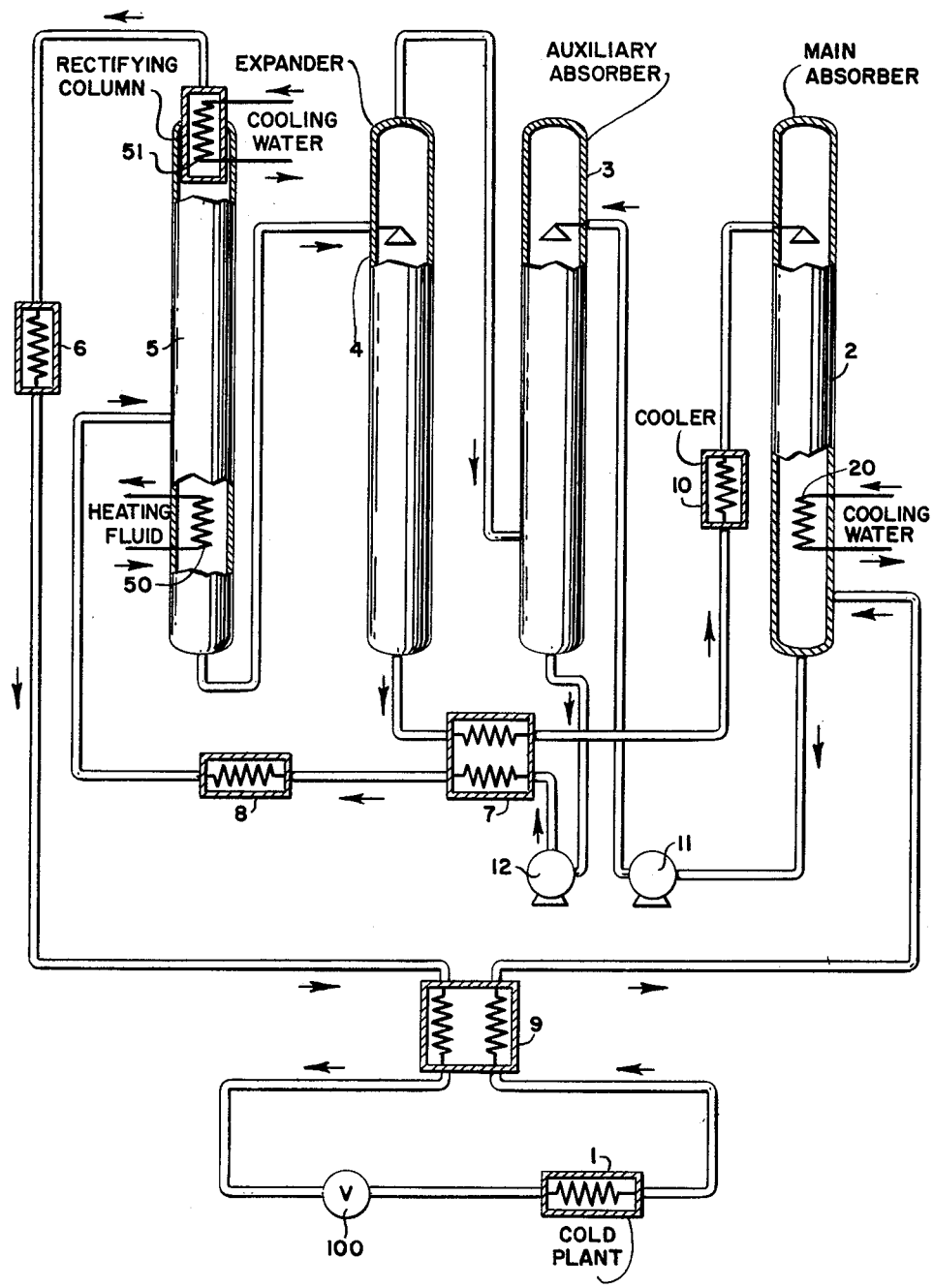

This invention is directed to an improvement in absorption refrigerating systems which produce artificial freezing at a low thermal level by employing a heat source and a refrigerant fluid, for instance water, available at a temperature higher than that of the desired artificial freezing. Such systems employ a heat source, for example: warm gases, vapors, or warm water; and a cooling source, such as water; and also an intermediate refrigerant fluid, usually ammonia.

The intermediate cooling fluid, ammonia for example, is evaporated, thus absorbing heat from the fluid which is to be cooled. The ammonia vapor is then removed from the evaporator to an absorber in which the vapor is absorbed by another fluid having a very low vapor pressure in comparison with that of the evaporated fluid, water being commonly employed.

The greater the absorption of the absorbed vapors, the greater is the degree of vacuum produced. In consequence, the thermal level at which the intermediate fluid is evaporated is commensurately lower, and also the temperature at which the evaporating fluid absorbs heat is correlatively lower.

During the absorption by water of the vapors of the intermediate fluid, namely ammonia, a strong evolution of heat occurs, which heat is removed from the system by a cooling medium, for instance water.

The solution thus formed, of the intermediate fluid in the absorbing fluid, is conveyed to a rectifying column in which the intermediate refrigerant fluid is separated from the absorbing fluid.

The intermediate fluid (ammonia), condensed at the top of the rectifying column by means of the cooling fluid, is conveyed to the evaporator, to be evaporated and then absorbed.

The absorbing fluid (water) is removed from the bottom of the rectifying column, and then passed in heat exchange with the solution entering said rectifying column. It is thereafter conveyed to an absorber, to absorb the vapors of the intermediate fluid (ammonia).

The rectification operation must be carried out under such a pressure that the intermediate fluid (ammonia vapor) may condense at the expense of the cooling fluid. For example, when operating with water available at the temperature of 30° C., said pressure, taking into account the temperature variations in the exchangers, cannot be lower than 12 to 14 atmospheres.

On the other hand, the absorbing fluid (water, or a solution of water and ammonia) which exits from the bottom of the rectifying column must not contain high amounts of the intermediate fluid, in order to easily absorb the intermediate fluid. If the absorbing fluid did contain said high amounts, the absorbing of the intermediate fluid (ammonia) takes place at a higher pressure, so that the evaporation temperature increases correspondingly.

To prevent this, the heat source which feeds the rectifying column must be able to supply heat at a temperature higher than the temperature at which the absorbing fluid boils, at the rectification pressure.

In many cases it is impossible to recover heat having a low thermal level for the production of artificial freezing at a low temperature. The low thermal level of the heat source does not permit good rectification of the absorbing fluid. The absorbing fluid therefore leaves the rectifying column with a high content of intermediate fluid (ammonia). The back pressure of absorption is thus too high, corresponding to a thermal level higher than the one desired.

To avoid this, absorption refrigerator cycles having several stages in series are used. Thus the back pressure in the evaporator and in the first stage absorber is reduced, through the successive absorbing and de-gassing operations. In this case, however, the yield decreases in almost direct proportion to the number of the necessary stages. Furthermore, the heat consumption and the cost of the plant increase in nearly direct proportion, the produced refrigeration units being equal. Thus, the utilization of heat at a low thermal level is not made more convenient.

An object of the present invention is to improve the described cycle so as to permit a decrease in the content of intermediate fluid (ammonia) in the absorbing fluid, in cases where by-product or recovered heat having a low thermal level is used for the production of artificial freezing at low temperature.

This objective is accomplished by expanding the absorbing warm fluid which leaves the bottom of the rectifying column, said warm fluid passing into an expander vessel in which equilibrium is established between the absorbing liquid and the intermediate fluid content thereof at a lower pressure, which permits a great part of the intermediate (ammonia) fluid yet present in the absorbing fluid (solution of water and ammonia) to liberate itself. The invention also employs an auxiliary absorber in which the vapors of the intermediate fluid set free in the expander are absorbed in the cold solution of the absorbing fluid and intermediate fluid leaving the main absorber.

This invention thus results in the impoverishment of the absorbing solution leaving the rectifying column in respect to the intermediate fluid (ammonia), before it is cooled, and in the enriching of the solution entering the rectifying column in respect to the intermediate fluid, before it is heated.

The degrees of impoverishment and enrichment are determined by the vapor pressures of the circulating solutions. In all cases, the result of the operation is to decrease the back pressure of the intermediate fluid in the absorber, and thus to decrease the thermal level of the evaporator.

Example

The absorption refrigerating plant described below was employed for production of 1,000,000 kcal./h. at −45° C., in which the absorbing fluid consisted of a solution of water and ammonia, and the intermediate fluid consisted of ammonia. Cooling water was available at +25° C.

The heat source had to be maintained at 170° C. Therefore, a heat source consisting of hot water coming at +145° C. from a heat recovering system of a chemical plant could not be used. To utilize said heat, it was necessary to provide a second absorbing stage, complete with an absorber and a rectifying system, with a consequent decrease in the yield of transformation of the calories into refrigerating units. Therefore, if a thermal level of −45° C. is obtained, the amount of the artificial freezing produced with the same availability or amount of heat, but at +145° C. instead of 170° C., was only 585,000 refrigerant units.

By applying the instant invention, it becomes possible to avoid the use of the second stage. Also, it is now possible to obtain 930,000 refrigerant units at −45° C., employing the same amount of heat but at +145° C. instead of 170° C., the productive power of the initial plant being reduced only 7%, but resulting in a remarkable recovering of heat at a thermal level lower than that for which the plant was originally designed.

The figure is a flow sheet showing schematically the absorption system of the present invention.

At 1 in the drawing is indicated a cold room or plant utilizing liquid refrigerant viz. cold liquid ammonia produced in the absorption refrigerating cycle illustrated above in the drawing, and sent to it under control of throttling valve 100. A main absorber is shown at 2, having a water-cooled coil 20 in its lower section.

At 3, 4, and 5 are, respectively, an auxiliary absorber, an expander, and a rectifying column. The rectifying column 5 is provided with a generator or heating coil below, at 50, and a water-cooled coil above, at 51. The lower part of the rectifier column, containing heating coil 50, is termed the generator. It releases the ammonia as ammonia vapor, a small amount of steam also passing upwardly, to be condensed at 51. The boiling off of the ammonia leaves a weak solution of ammonia, which is passed to the top of expander 4.

At 6 is shown a condenser for vapor leaving rectifier 5. At 7 is a heat exchanger, and at 8 is a preheater. At 11 and 12 are pumps for liquid.

The functions of the above apparatuses are as follows:

The intermediate fluid, ammonia for example, leaves cold plant 1 in gaseous phase. The ammonia gas is passed through supercooler 9 in heat exchange relation with the intermediate fluid (ammonia) received in liquid phase from condenser 6. The gas is then absorbed in main absorber 2, by contacting with absorbing fluid (water for example), which is received from expander 4 after giving up heat in heat exchanger 7 and cooler 10.

The liquid solution leaving the bottom of main absorber 2 is conveyed by pump 11 to auxiliary absorber 3, in which gas set free in expander 4 is absorbed by said solution.

The intermediate liquid solution produced in auxiliary absorber 3 is conveyed by pump 12 to rectifying column 5, through heat exchanger 7 and preheater 8.

The vapor produced in the top of rectifier column 5 is condensed in condenser 6, after passing through a cooling zone, in contact with a water-cooled coil 51. The liquid condensate is then passed through supercooler 9 before being conveyed to utilizing plant 1, after throttling to a lower pressure in valve 100.

I claim:
1. An absorption refrigeration process, employing an absorbing liquid and a refrigerant fluid, which comprises the steps of:
 (a) commingling a first quantity of vaporous refrigerant fluid with the absorbing liquid so that the vaporous refrigerant fluid is absorbed by the absorbing liquid to form a weak intermediate solution,
 (b) simultaneously removing at least part of the heat of absorption from the absorbing liquid by indirect heat exchange of the absorbing liquid with a cold medium,
 (c) commingling a second quantity of the vaporous refrigerant fluid with said weak intermediate solution so that said second quantity of vaporous refrigerant fluid is absorbed by said weak intermediate solution to form a stronger intermediate solution,
 (d) heating said stronger intermediate solution to rectify the same by stripping part of the absorbed refrigerant fluid as a vapor therefrom at a specific pressure and separating the same from a remaining weak liquor,
 (e) condensing said stripped vaporous refrigerant fluid to a liquid refrigerant fluid,
 (f) vaporizing said first quantity of vaporous refrigerant fluid from said liquid refrigerant fluid,
 (g) expanding said weak liquor to vaporize said second quantity of vaporous refrigerant fluid therefrom at a pressure below said specific pressure and separating the same from a remainder constituting the absorbing liquid,
 (h) cooling the absorbing liquid by heat exchange with said stronger intermediate solution, and repeating the foregoing steps.

2. The process defined in claim 1, the heating of said stronger intermediate solution to rectify the same being carried out at superatmospheric pressure, to facilitate condensation of the vaporous refrigerant fluid by said cold medium.

3. The process defined in claim 1, the refrigerant fluid being ammonia, the said cold medium being water at about 10° to 30° C., the specific pressure during the rectifying of said stronger intermediate solution being a plurality of atmospheres.

4. An apparatus system for carrying out an absorption refrigeration cycle, comprising a first absorber, a second absorber, an expander, and rectifying and generator apparatus, means connected to the first absorber for introducing refrigerant vapor to be absorbed therein, means connected to the first absorber for feeding absorbing liquid thereto, means including a first pump for withdrawing from the first absorber the liquor formed therein, said liquor comprising the refrigerant dissolved in the absorbing liquid, and for introducing said liquor into the second absorber, means including a second pump for removing liquor produced in the second absorber to the generator apparatus, means provided by the generator apparatus for heating the last-mentioned liquor at a specific pressure to vaporize the refrigerant therefrom, the rectifying apparatus having cooling means to condense vaporized absorbing liquor, means to remove and to condense the thus produced refrigerant vapor, means to vaporize said condensate at a pressure below said specific pressure and to pass the vaporized refrigerant to a location requiring refrigeration, means to return the vaporized refrigerant to said first absorber, means to remove weak liquor produced in the generator-rectifier apparatus to the expander, to release refrigerant vapor from said weak liquor, means to pass said released refrigerant vapor to the second absorber for absorption therein, means for passing liquor from the expander to the first absorber to absorb the refrigerant vapor as aforesaid, the latter means including an apparatus providing heat exchange with the liquor passed from the second absorber to the generator and rectifying apparatus, to preheat the latter liquor.

5. The apparatus defined in claim 4, the first and second pumps being rated to produce at least two atmospheres pressure in the rectifying apparatus, and a pressure in the expander which is at least one atmosphere lower than that in the rectifying apparatus.

6. An apparatus system for carrying out an absorption refrigeration cycle, comprising a first absorber, a second absorber, an expander, and rectifying and generator apparatus, means connected to the first absorber for introducing refrigerant vapor to be absorbed therein, means connected to the first absorber for feeding absorbing liquid thereto, means including a first pump for withdrawing from the first absorber the liquor formed therein, said liquor comprising the refrigerant dissolved in the absorbing liquid, and for introducing said liquor into the second absorber, means including a second pump for removing liquor produced in the second absorber to the generator apparatus, means provided by the generator apparatus for heating the last-mentioned liquor at a specific pressure to vaporize the refrigerant therefrom, the rectifying apparatus having cooling means to condense vaporized absorbing liquor, means to remove and to condense the thus produced refrigerant vapor and to pass the resulting condensate to a location requiring refrigeration, means to return the resulting vaporized refrigerant at a pressure below said specific pressure to said first absorber, means to remove weak liquor produced in the generator-rectifier apparatus to the expander to release refrigerant vapor from said weak liquor, means to pass said released refrigerant vapor to the second absorber for absorption therein, means for passing liquor from the expander to the first absorber to absorb the refrigerant vapor as aforesaid.

References Cited by the Examiner

UNITED STATES PATENTS

| | | | |
|---|---|---|---|
| 967,992 | 8/10 | Starr | 62—496 |
| 2,003,310 | 6/35 | Rexwinkle | 62—496 X |
| 2,178,603 | 11/39 | Nelson | 62—496 X |
| 2,182,098 | 12/39 | Shellew | 62—112 X |

ROBERT A. O'LEARY, *Primary Examiner.*